Patented Jan. 28, 1947

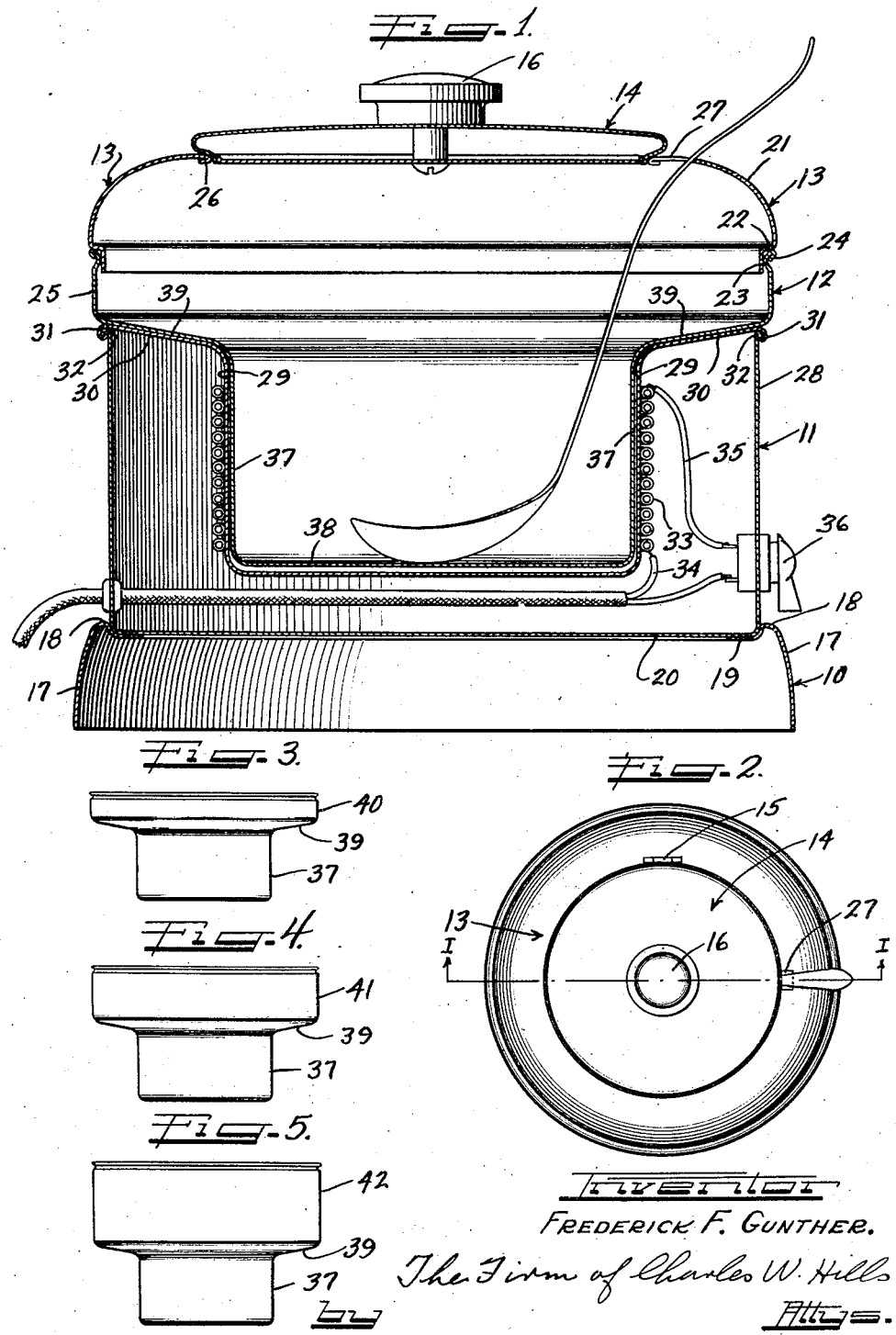

2,414,868

UNITED STATES PATENT OFFICE 2,414,868

FOOD RECEPTACLE IN ELECTRICALLY HEATED STAND

Frederick F. Gunther, Chicago, Ill., assignor to Helmco, Inc., Chicago, Ill., a corporation of Illinois Application May 19, 1945, Serial No. 594,724

1 Claim. (Cl. 219—43)

This invention relates to heating devices and pertains more particularly to devices wherein food or fudge or the like are maintained at an elevated temperature to be in readiness for immediate distribution at all times.

Such devices include principally a removable food container which is to be cleaned from time to time and a base which supports the container and houses a heating element to maintain the contents at an elevated temperature.

It is an important object of my invention to provide a device of the above character in which the parts are so constructed as to more efficiently conduct heat to the substance being warmed in the container.

In the past, the manufacture of such devices, due to the requirements of the trade, has involved the construction of many different models to accommodate different capacity requirements of the different users. This has required a complex manufacturing problem since, in order to provide many different capacities for the demands of the trade, it has been necessary for the manufacturer to tool up for many different sizes of bases whereby the parts of one base will require separate operations from the like parts of another base and wherein heating elements and the like, likewise vary.

It is a primary object of the present invention to provide a food warmer construction in which there is included a universal base adapted for retaining and heating a container, the containers being arranged to be constructed to accommodate varying capacities and yet all fit within this universal base construction and all are efficiently heated by the same capacitiy heating element.

In the past the variation to obtain different capacity warmers has been accomplished by transverse variation or variation in the diameter of the assembly, this factor being that which necessitated the provision of an individual supporting heater with each model.

On the other hand, and as another object of the present invention, the variation in container capacity is obtained by the present invention, by variation in the longitudinal dimension whereby changes in the base are rendered unnecessary and the variation in capacity can be confined to the container itself, the varying size containers being interchangeably disposable in the universal base or heating part, this variation in the longitudinal dimension being possible without loss in heating efficiency in view of accompanying structure in accordance with my invention which promotes more efficient heating of the material in the container.

It is a further object of the present invention to provide an improved construction whereby a spoon or other implement may be associated with the warmer when the lid thereof is closed and yet whereby the implement will not be picked up and thrown laterally upon manipulation of the lid, assuming that the same is hinged.

Many other objects and advantages of the invention will become apparent from the following description and accompanying drawing, in which:

Figure 1 is an enlarged cross-sectional view taken on the line I—I of Figure 2;

Figure 2 is a top plan view of a food warmer embodying my invention; and

Figures 3, 4 and 5 are side elevational views on a reduced scale of a series of containers having different capacity and adapted for use with the universal base shown in Figure 1.

The embodiment shown herein is for illustrative purposes and may be changed or modified without departing from the spirit and scope of the invention as set forth in the appended claim.

As shown in Figure 1 the food warmer includes generally a base 10, a heater and support 11, a food container 12, a closure ring 13 and a lid 14 hinged as at 15 in Figure 2, and having a suitable insulated handle 16.

The base 10 is provided generally with an outer arcuate wall 17 terminating in an upstanding circular rib 18 which merges with a generally radially inwardly extending flange 19 that supportingly engages the outer edge margin of the bottom 20 of the supporting structure 11. This supporting structure may be loosely seated thereon but preferably the flange 19 is spot welded thereto.

The circular closure ring 13 is also provided with a generally, arcuately formed circular wall 21 extending downwardly to a radially inwardly shouldered part 22 which in turn merges with a downwardly extending skirt 23. The skirt 23 is of such a diameter as to snugly engage in the upper, open end of the container 12 with friction fit, the container 12 being preferably beaded as shown at 24. The bead 24, it will be seen, is of such a size that it does not over-extend the radially outer extremity of the closure ring 13 and thus food which is accidentally deposited upon the closure ring 13 will not be deposited in such a position to seal the member 13 to the container 12 but rather will drip thereover onto the side flange 25 of the container.

The upper part of the closure ring 13 extends radially inwardly and is beaded as at 26 to define a cover opening into which a suitable cover 14 may be fitted. As shown in Figure 2 and as described above, the cover 14 may be hinged to the closure ring as at 15.

To the end that a suitable ladle or spoon may be relatively permanently associated with the structure, the closure ring 13 is slotted to provide an opening 27 through which the handle of the ladle or spoon may extend when the cover 14 is closed. Heretofore it has been customary to provide the slot in the cover itself with the result that when the cover is opened about its hinge the spoon is sometimes picked up and thrown out of the container. This, of course, results in a loss of the material being warmed and is not conducive to cleanliness. With the present structure, however, manipulation of the lid 14 does not in any way effect movement of the ladle or spoon which remains in the position shown until the user desires to pick the handle thereof out of the slot 27.

As indicated previously, a food warmer constructed in accordance with the present invention provides a more efficient heat transmission from a suitable heating element to the substance being warmed. This is particularly desirable in the present instance since it is one of the aims of the invention to provide a single, universal heating element to accommodate a plurality of containers having different capacities. In the past it has been necessary to provide different heating elements for heating the food in different capacity containers.

In the construction shown, the support 11 includes an outer wall section 28 which is cylindrical in form having the bottom 29 and being open at the top. Seated in the support 11 is a concentrically disposed container receiving heating member including a well portion 29 bordered at the upper part thereof by a generally radially outwardly flared annular portion 30. This annular portion 30 is curled as at 31 to interlock with the beaded upper edge of the wall 28 shown at 32. In this manner the support 11 is provided with parts which define a substantially cylindrical closed chamber which is heated by a suitable heating element 33 mounted around the well portion 29 of the heating member.

The heating element 33 is energized by electrical leads 34 and 35, one of which as shown at 35 includes a switch member 36 suitably mounted in the wall 28 of the supporting structure 11.

As indicated previously, the present arrangement is adapted to receive containers of different capacities and normally this difference in capacity requires different heating elements to maintain different amounts of substances in the varying size containers at the desired uniform temperature. In the present instance, however, a novel configuration is imparted to the support structure 11 and particularly the heating member thereof, and the varying sized containers are each provided with a uniform shape to conform to this configuration, this shape, and that of the supporting structure being such as to more efficiently transfer the heat created by the element 33 to the substance within the container.

As will be seen from Figures 1, 3, 4 and 5 of the drawing, the containers 12 are each provided with identical, lower well portions including cylindrical walls 37, bottoms 38 and substantially radially outwardly flared wall portions 39, these parts of the containers being adapted to conform closely to the configuration of the heating member of the supporting structure 11 which includes the cylindrical wall 29 and the radially outwardly flared annular portion 30.

As will be seen from Figures 3, 4 and 5, a variation in the capacity of the container may be obtained by varying the depth of the vertical circular wall as shown at 40, 41 and 42. This variation in construction causes an increase in the depth of the upper strata of the substance in the container and it is in this increased depth of the upper strata where insufficient heating is liable to occur unless provision is made therefor.

From Figure 1 it will be seen that when the heating element 33 has attained an elevated temperature not only will the air in the space which it occupies become heated but furthermore heat will be conducted from the vertical walls 29 and 37 to the substantially radially extending walls 30 and 39 of the heating member and container respectively. When the walls 39 attain an elevated temperature they will, of course, heat a wide strata of the material in the container along the horizontal as compared to a relatively thin transverse strata along the surface of a completely vertical wall such as has been used in the past. It has been found that this presentation to the substance in the container of a relatively wide annular, substantially horizontally disposed heating surface greatly augments the heating capacity of the elements 33. This increased heating capacity has been found to provide a more uniform heating as between the three exemplary container sizes shown in Figures 3, 4 and 5 than is the case when the variation in capacity represented by the containers in those figures is provided merely with vertical walls.

From the foregoing it will be seen that in the use of a heater constructed in accordance with my invention, particularly when liquids are placed therein, the warm current will not be confined to transversely thin, vertically rising columns but will, in view of the substantially horizontally extending annular sections 30 and 39 of the heating member and the container respectively, include a transversely wide, vertically rising, circular column initiated at the surface of the annular portion 39 of the container. This column, it will be seen, rises through the upper strata in the container which itself is not within the confines of the supporting and heating structure 11.

With the foregoing construction it will be seen that an element of minimum heating capacity may be utilized to maintain the material within the container which extends upwardly out of the confines of the actual heating structure at the desired temperature regardless of the volume thereof, within reasonable limits.

From the foregoing it will be seen that there is provided an efficient heater adapted for the purposes described which may be manufactured from relatively cheap spinning, stamping and crimping operations and which may be assembled cheaply and with great facility.

I claim as follows:

In an apparatus of the class described for heating foods, comprising a heater, a food container and a closure member for the container; said heater comprising a base and an outer cylindrical wall and a cylindrical cup concentric with said wall and spaced from it, said cup having an integral upwardly and outwardly flaring portion connected at its perimeter to the upper margin of said wall and constituting the top portion of the heater, electric heating coils about the exterior of said cup; said food container having an imperforate cylindrical cup-like lower portion enterable in the cup of said heater in a snug fit and having an intermediate outwardly flaring portion to conform to and rest on the flaring portion of the heater in surface contact when the container is in place in the heater, said container having a cylindrical wall rising from the margin of the intermediate flaring portion thereof of greater diameter than the cup-like lower portion; said closure member being of circular shape in plan and having a lower annular flange enterable in the upper margin of the cylindrical wall of said container with a press fit, the outer diameter of said flange being less than the maximum diameter of the closure member, said closure member having a lid-receiving opening, and a lid insertable in said opening, the maximum diameter of said closure member being as great as the diameter of the upper margin of the cylindrical wall of the container.

FREDERICK F. GUNTHER.